(12) United States Patent
Voorhees

(10) Patent No.: US 8,300,067 B2
(45) Date of Patent: Oct. 30, 2012

(54) DISTANCE CAMERA HAVING A MEMORY MODULE

(75) Inventor: Garald Voorhees, St. Petersburg, FL (US)

(73) Assignee: Freedom Scientific, Inc., St. Petersburg, FL (US)

( * ) Notice: Subject to any disclaimer, the term of this patent is extended or adjusted under 35 U.S.C. 154(b) by 1085 days.

(21) Appl. No.: 11/560,670

(22) Filed: Nov. 16, 2006

(65) Prior Publication Data

US 2008/0117313 A1  May 22, 2008

(51) Int. Cl.
*G09G 5/00* (2006.01)
(52) U.S. Cl. .......................... 345/660; 345/606
(58) Field of Classification Search .............. 345/660, 345/606
See application file for complete search history.

(56) References Cited

U.S. PATENT DOCUMENTS

| | | | |
|---|---|---|---|
| 4,808,987 A * | 2/1989 | Takeda et al. | 345/667 |
| 3,010,324 A | 4/1991 | Yamamoto | |
| 5,585,863 A | 12/1996 | Hackett et al. | |
| 5,714,973 A | 2/1998 | Takahashi et al. | |
| 5,874,965 A | 2/1999 | Takai et al. | |
| 5,875,428 A | 2/1999 | Kurzweil et al. | |
| 5,943,679 A * | 8/1999 | Niles et al. | 715/247 |
| 5,959,605 A | 9/1999 | Gilblom | |
| 6,052,663 A | 4/2000 | Kurzweil | |
| 6,064,426 A | 5/2000 | Waterman | |
| 6,236,766 B1 * | 5/2001 | Zavaljevski et al. | 382/300 |
| 6,731,326 B1 * | 5/2004 | Bettinardi | 348/63 |
| 6,791,600 B1 | 9/2004 | Chan | |
| 6,952,220 B1 | 10/2005 | Rossmann | |
| 6,965,412 B2 | 11/2005 | Reed et al. | |
| 7,030,894 B2 | 4/2006 | Allen et al. | |
| 2003/0113035 A1 | 6/2003 | Cahill et al. | |
| 2005/0062847 A1 | 3/2005 | Johnston | |
| 2005/0162512 A1 * | 7/2005 | Seakins | 348/62 |
| 2006/0147197 A1 | 7/2006 | Spruck et al. | |
| 2006/0193536 A1 | 8/2006 | Pilu | |

FOREIGN PATENT DOCUMENTS

GB      2373662 A      9/2002

* cited by examiner

*Primary Examiner* — Maurice L McDowell, Jr.
(74) *Attorney, Agent, or Firm* — GrayRobinson, P.A.; Michael J. Colitz, III

(57) ABSTRACT

A method is provided for displaying information from a distance on a monitor. By defining an image plane, the inventive system displays an area of focus of the plane on the monitor while storing the image in short-term memory. When the user selects a subsequent area of focus it is stored in short-term memory also, along with the first area of focus. The user is allowed to toggle between the stored images without having to recapture previously viewed information by retaining subsequent areas of focus in short-term memory. The user can discard, or delete, unwanted areas of focus or choose to move them to permanent memory. It is also possible to organize multiple areas of focus into groups or albums or save them individually.

38 Claims, 7 Drawing Sheets

DISTANCE CAMERA HAVING A MEMORY MODULE

FIELD OF INVENTION

This invention relates to electronic devices for aiding people with low vision.

BACKGROUND OF THE INVENTION

Low vision is a general term used to describe lowered visual acuity, and a specific legal term in Canada and the United States used to designate someone with vision of 20/70 or less in the better eye with correction. It can be a result of either congenital or acquired factors. An example of the former is Leber's congenital amaurosis and of the latter age related macular degeneration.

Some people with low vision can use their residual vision—their remaining sight—to complete daily tasks without relying on alternative methods. The role of a low vision specialist is to maximize the functional level of a patient's vision by optical or non-optical means. Primarily, this is by use of magnification in the form of telescopic systems for distance vision and optical or electronic magnification for near tasks.

Visually impaired patients may benefit from high-tech aids such as OCR scanners that can, in conjunction with text-to-speech software, read the contents of books and documents aloud via computer. Vendors also build closed-circuit televisions that electronically magnify paper, and even change its colour contract, for visually impaired users.

The vast majority of patients with low vision can be helped to function at a higher level with the use of low vision devices. Low vision specialists recommend appropriate low vision devices and counsel patients on how better to deal with their reduced vision in general. See, for example, *Computer Resources for People With Disabilities: A Guide to Assistive Technologies Tools and Resources for People of All Ages*, Alliance for Technology Access, Hunter House, Inc. Publishers, 2004; and *In Sight: Guide to Design with Low Vision in Mind*, Lucienne Roberts, Rotovision 2004 which are incorporated herein by reference.

The use of a CCTV or video magnifier is a simple way providing access to classrooms and public events to people with low vision. In the classroom setting, for example, printed material and objects displayed at the front of the room can be captured by a camera and the magnified image is displayed on a television screen or computer monitor. There are a large number of different types of models to choose from and they vary widely in the features offered.

For example, U.S. Pat. No. 6,731,326 to Bettinardi (which is incorporated herein by reference) describes a method of displaying information captured from a camera on a monitor. The camera captures an image and then allows the user to select a smaller portion for full, magnified, display. The '326 patent also provides a method of allowing the user to pan the image and zoom in on a desired area. The user, however, must recapture information as he moves from portion to portion of the image. This takes additional time as well as requiring significant resources from the processor controlling the display.

Of the commercially available distance cameras, a problem arises where a user wishes to toggle through various areas in the camera's line of sight. Continuing with the classroom example; a user may wish to pan and zoom such as where a chalkboard contains a large amount of written information. Previous devices required a user to recapture information when a user desired to scroll back, perhaps to review some previous information. The need to recapture the image of the chalkboard creates a cumbersome interface, as well as wasting computer resources.

SUMMARY OF INVENTION

In a first embodiment, the invention includes an image display method utilizing an image capture device, a display in communication with the image capture device and an image memory in communication with the image capture device and display. The user defines an area of interest, either manually or through software developed to implement the invention, and then captures a plurality of images, or areas of focus, each image comprising at least a portion of the area of interest. The method stores the plurality of images in the image memory and establishes a location parameter associated with each image (to designate where the area of focus is located within the area of interest). The images are shown on the display, usually as a full image allowing the user to cycle through the images according to the location parameter associated with each image.

The user can further manipulate or alter each image or area of focus; such as changing magnification levels, orientation (rotation) and navigation. In some instances, such as when an area of focus is captured from a stored image of the area of interest rather than directly from the image capture device, the method provides the missing pixels in the magnified view using known interpolation techniques.

Although many location techniques are contemplated, one embodiment of the invention establishes the location parameter for each image using a Cartesian coordinate system whose increments are automatically determined by the resident software. Alternate embodiments, however, allow a user to manually determine location parameters.

The method also allows a user to display a live image of an area (such as the field of view or the areas of focus). The plurality of images are stored independently in image memory but can also be stored in an array for organization and efficient recall. All images in image memory can be stored to permanent (mass) memory without disrupting the user's access.

The invention also includes a device for implementing the previously describe method. The device includes a processor module, an image capture device communicatively coupled to the processor module, a monitor communicatively coupled to the processor module; and an image memory communicatively couple to the processor module. The image capture device is adapted to define an area of interest as well as to capture a plurality of images comprising an area of focus; the processor, however is also capable of capturing the areas of focus from a stored image of the area of interest. The processor module is also adapted to establish a location parameter to each are of focus regardless of how it is captured. The image memory is adapted to store the plurality of images captured by the image capture device or processor. The monitor displays each image, usually as a full image.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Figure 1:
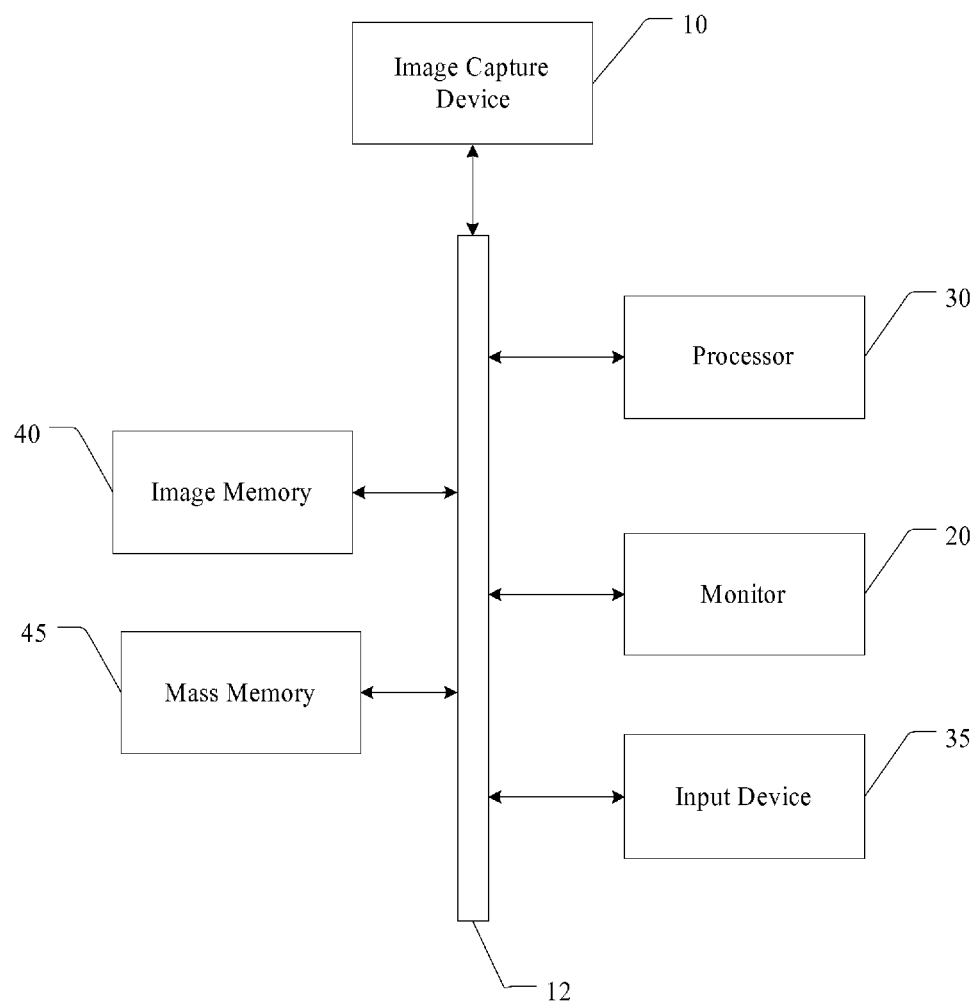
FIG. 1 is a block diagram of an illustrative architecture for employing the inventive method.

The instant invention, hereinafter "the invention," includes a method of displaying graphic and textual information on an electronic screen to enhance visibility for persons with low vision or who are otherwise visually impaired. The invention employs the use of multiple, communicatively coupled hardware devices under the control of instructions from software designed to implement the invention. A general embodiment, shown in FIG. 1, uses image capture device 10, monitor 20, processing unit 30 and image memory 40. An alternate embodiment also includes user input device 35 and mass memory 45.

Image capture device 10 is commonly a distance camera, specifically designed for use by persons with low vision, but can be any imaging device capable of capturing an image of textual or graphic information. In a preferred embodiment, capture device 10 is coupled to the invention in a closed-circuit. The signal from capture device 10 is therefore transmitted to a predetermined number of users. The users are directly linked to image capture device 10, although the link may include point-to-point wireless connections. An example of an embodiment employing a single capture device and multiple monitors is a classroom specifically equipped to accommodate a number of users with low vision. In this embodiment, wherein a single image capture device is shared, successive areas of focus are captured from an image of the entire area of interest.

Monitor 20 is any device that can display signals generated by image capture device 10 and processor 30. While monitor 30 is most commonly a computer display (i.e. LCD, CRT), it can also include a portable device such as a PDA, or other wireless device, and a dedicated viewing device.

Processor 30 is any logic unit capable of running the software for implementing the invention. Processor 30 is connected to capture device 10, monitor 20, input device(s) 35, image memory 40 and mass memory 45 through bus 12. Processor 30 performs selected operations under the instructions of the corresponding operation program (the "software"). The software, in an illustrative embodiment, is stored in and selected from mass memory 45.

Image memory 40 is, in an illustrative embodiment, a temporary storage location where images captured by image capture device 10 are stored. The images, representing the area of interest or multiple areas of focus, are stored in image memory prior to being saved in mass memory 45, altered (i.e. magnified or rotated) by processor 30 or displayed by monitor 20. Accordingly, a user can easily return to the original image saved in image memory 40 after the image is otherwise altered. Image memory 40 can be volatile (memory which is lost if power is disrupted) or nonvolatile memory.

Mass memory 45 is any device capable of storing, usually large amounts, information in a persistent and machine readable form. Examples of devices suitable for mass media 45 include, but are not limited to hard disks, floppy disks, drum memory, magentic tape, flash memory, optical disks, megneto-optical disks and holographic memory. Mass memory 45 does not include random access memory (RAM) or volatile memory.

In an illustrative embodiment, the invention permits a user to capture an area of interest, such as a blackboard or whiteboard in a classroom, through image capture device 10 for viewing on monitor 20. The captured image can be magnified for easier viewing by the user. Moreover, the user can capture multiple images for magnification and viewing without losing previously captured images. Continuing with the example of a classroom setting, the user positions image capture device 10 to focus on the area of interest; namely the chalkboard, containing textual and graphic information, at the front of the room. The user can then capture specific subregions of the area of interest, or areas of focus, for viewing.

Figure 2:
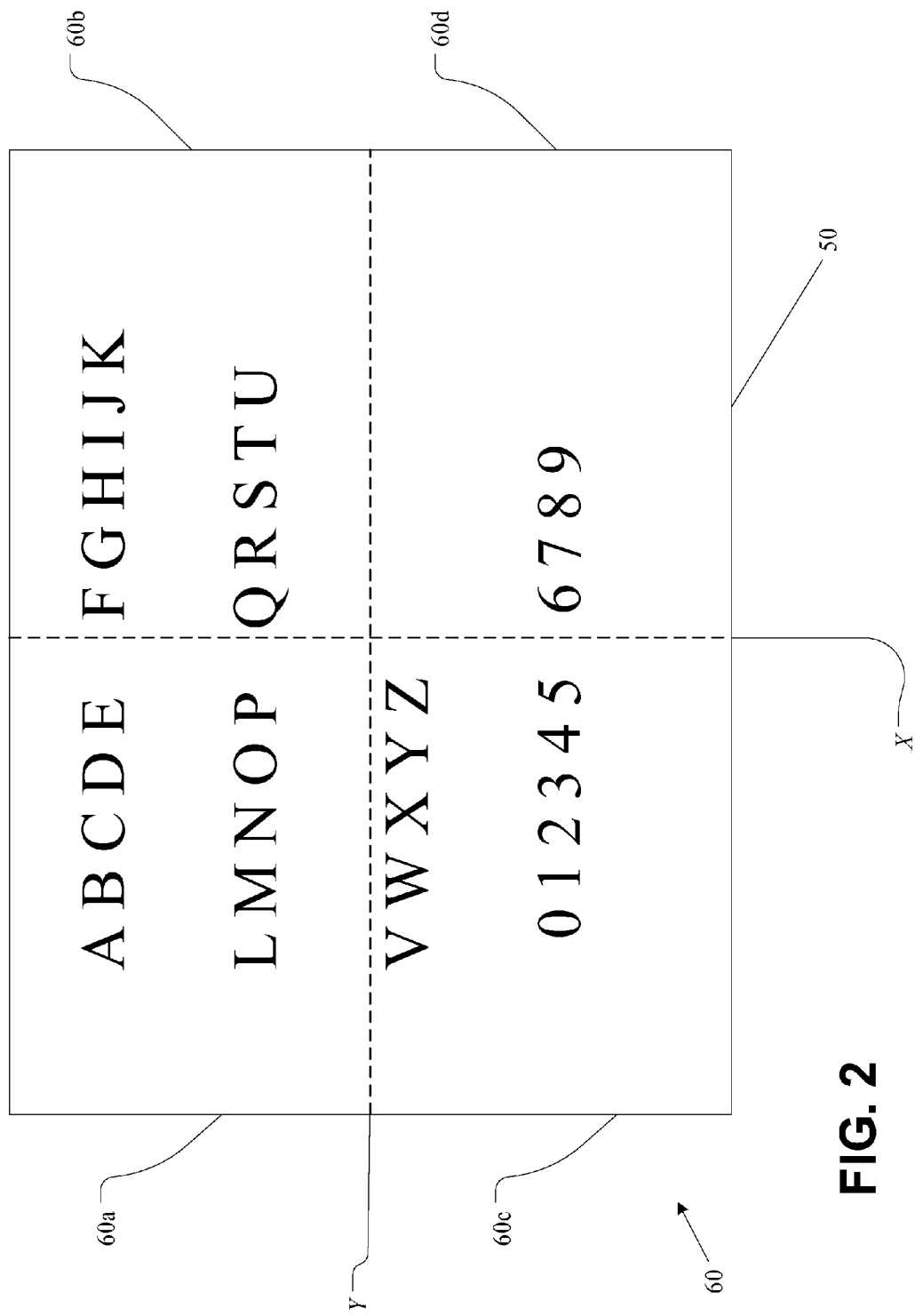
FIG. 2 illustrates how an area of interest is divided into multiple areas of focus.

Referring now to FIG. 2, the user may decide to divide the chalkboard (area of interest 50) into quadrants (areas of focus 60). The user decides to capture quadrant I (60a), II (60b), III (60c) and IV (60d) successively. In this example, each area of focus (quadrant) is saved in image memory 40 independently for quick and easy recall by the user. The user can therefore bring up each area of focus for viewing, including magnification and navigation, without losing the remaining areas of focus. This frees the user from having to "re-capture" information. The user can easily cycle through images of the areas of focus saved in image memory.

In one embodiment, processor 30 establishes boundary parameters for area of interest 50, using methods such as a Cartesian coordinate system. The boundary parameter is used to assign location values to points in the plane of the area interest, i.e. x-coordinates and y-coordinates. Coordinates are established by defining two perpendicular axis and assigning a unit length to each. The unit length assigned to each axis, as well as the points defining the x and y coordinates, are preferably determined by processor 30 but can also be defined by the user. The area of interest can be defined in numerous ways. The user can define the area of interest by adjusting the focus of image capture device 10, or using a graphic interface to highlight, or crop, an image displayed on monitor 20.

The invention also provides an embodiment wherein processor 30 electronically determines and captures multiple areas of focus after area of interest 50 has been defined by the user. In this example, processor 30 uses the boundary parameter to establish the multiple areas of focus, the size of which can be user defined (i.e. quadrants) or set by default. Each area of focus can be captured from an image of the entire area of focus or by a motorized device attached to the image capture device. An example of a suitable motorized device is described in U.S. Pat. No. 6,964,412 to Reed et al, which is incorporated herein by reference.

The area of interest can be stored in image memory 40 or saved to mass memory 45 prior to being displayed on monitor 20. The area of interest can further be magnified, navigated or otherwise manipulated by processor 30 for direct viewing on monitor 20.

Once the area of interest has been defined, and assigned boundary parameter values in some embodiments, areas of focus 60 can be captured. Area of focus 60 can be a subregion of area of interest 50 but in some cases, as discussed above, is the entire area of interest. In all cases, area of focus 60 comprises at least a portion of area of interest 50. It is also possible for an area of focus to comprise all or some of another area of focus.

Figure 3:
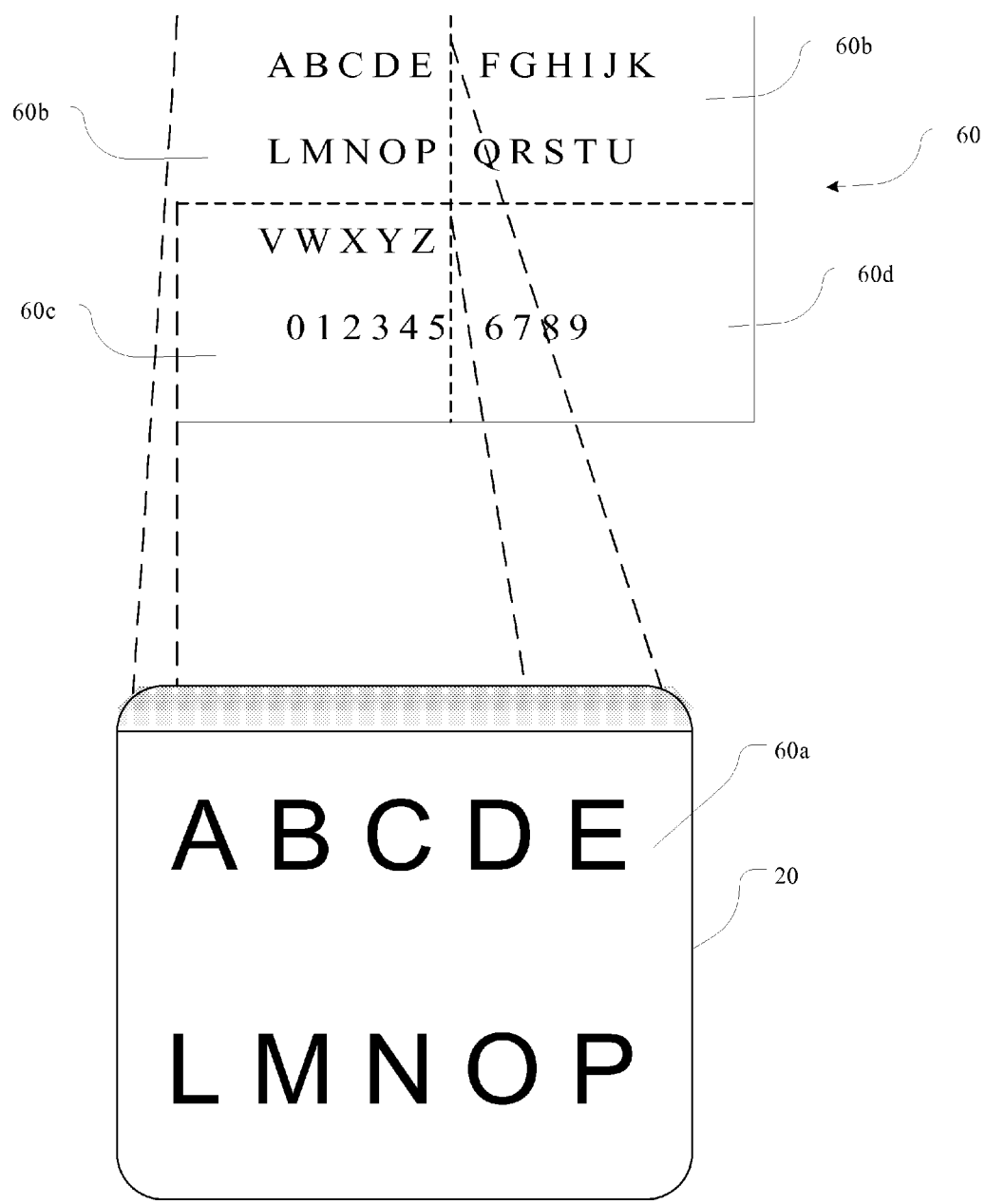
FIG. 3 illustrates an enlarged area of focus selected from the area of interest and displayed on a screen.

When area of focus 60 is established, processor 30 assigns an identification value to identify its location within the area of interest. In keeping with the illustrative embodiment above, the area of focus is assigned a location value based on the Cartesian coordinates corresponding to its location relative to the x and y axis of area of interest 50. It is also possible, however, to assign other values based on parameters such as order-captured, quadrant, size, etc. Area of focus 60 is then displayed as a full image on monitor 20, as shown in FIG. 3. The area of focus can be further magnified, navigated or otherwise manipulated by processor 30 during viewing on monitor 20. It is also possible to save such an altered (manipulated) area of focus as displayed in either image memory 40 or mass memory 45.

Figure 4:
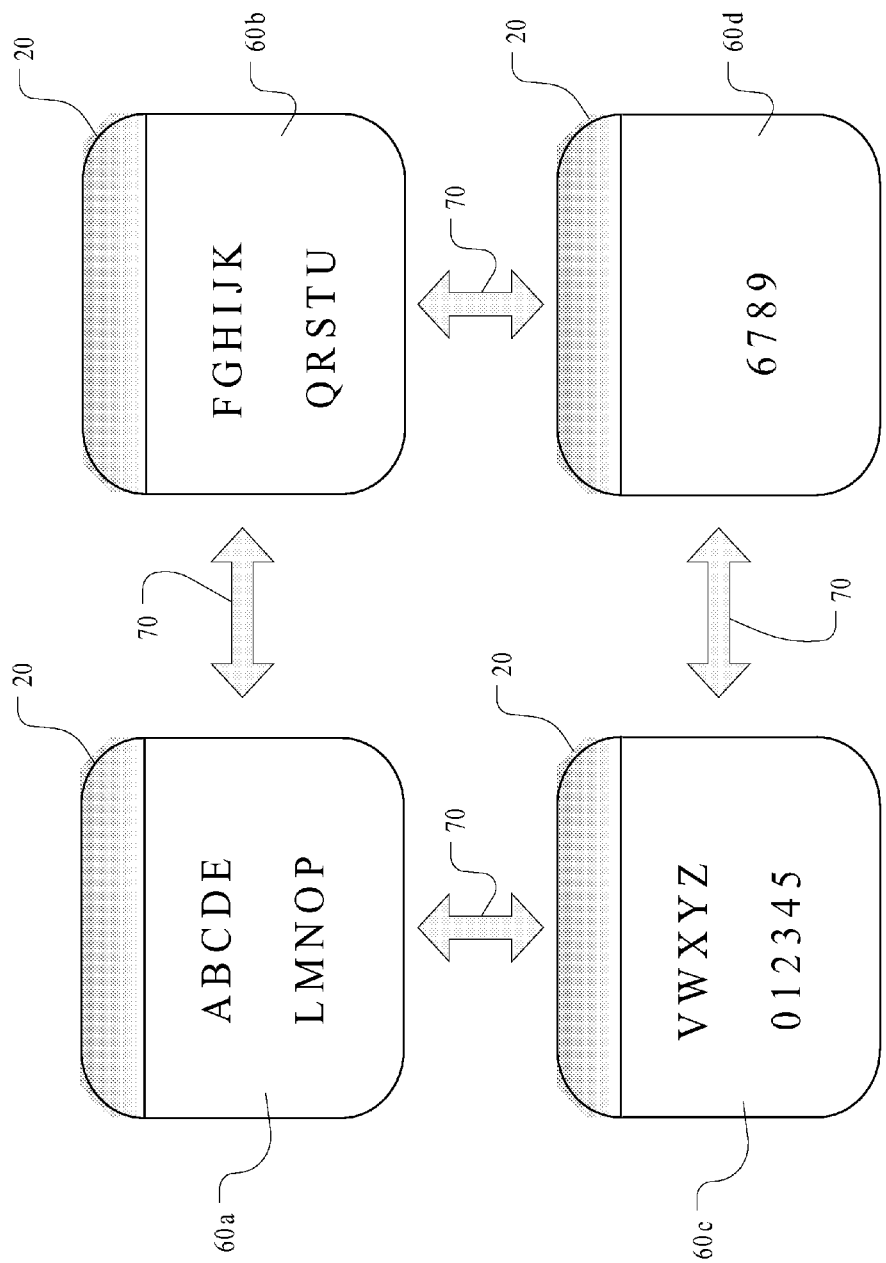
FIG. 4 is a block diagram illustrating directional navigation of the areas of focus.

FIG. 4 illustrates one advantage of assigning a location value to each area of focus. Here it can be seen that providing a spatial identity to each area of focus makes it easier for a user to navigate individual areas of focus, 60a through 60d, relative to the entire area of interest 50. The user can be provided with directional navigation input options 70, i.e. "left," "right," "up" and "down", rather than (or in addition to) providing the user with common functions such as "next page" and "previous page."

The invention provides the user with the ability to capture images of multiple areas of focus in temporary (image memory) and/or permanent memory (mass memory). Moreover the user can toggle between the plurality of images of the areas of focus in memory and/or a live image (passing directly from the camera to the monitor) without losing instant access to the saved images. Previously, the user was required to recapture the image after changing views. The interface also allows the user to remove unwanted images from image memory while keeping remaining images in the toggle cycle.

It is also possible, using the invention, to save images in image memory to mass memory without removing them from the toggle cycle. Images can be saved in mass memory as either individual images or in an array for convenient recall. Individual areas of focus can further be removed from the toggle cycle without disturbing the integrity or location parameter associated with the remaining images. Once an area of focus has been removed from the toggle cycle, processor 30 alters the toggle cycle to allow navigation to the next logical image when the user cycles through to where the deleted image would have otherwise been viewed.

By defining an area of focus, the user can zoom in on and navigate the textual and graphic information contained therein. The area of focus (or interest) is defined by adjusting the magnification of the camera or an image in image memory. Menus and/or key combinations switch views of consecutive areas of focus (left, right, up or down) as defined by the location parameter associated with each area of focus. This can be accomplished by accessing images in image memory or by providing live views of the area of focus and moving the camera with an associated motorized apparatus providing a smooth pan in the desired direction. Panning stops when reaching the boundary of the relevant area of focus or the area of interest.

In an alternate embodiment, the invention allows the user to alter the magnification of any area of interest 50, or area of focus 60 and automatically adjusts the values for the remaining areas in turn. For example, the user establishes area of interest 50, again a chalkboard, and captures the image thereof at 8× magnification. Processor 30 then establishes four areas of focus which are also captured at 8× magnification and displayed as full images. If the user then increases the magnification of area of focus 50 to 9×, processor 30 automatically adjusts the magnification level of the four established areas of focus to 9× magnification as well. Similarly, if the user increases or decreases the magnification of a particular area of focus, processor 30 automatically adjusts the magnification level of the remaining three areas of focus as well as the area of interest accordingly. This saves the user from having to continually adjust the magnification level for the successive views.

Figure 5:
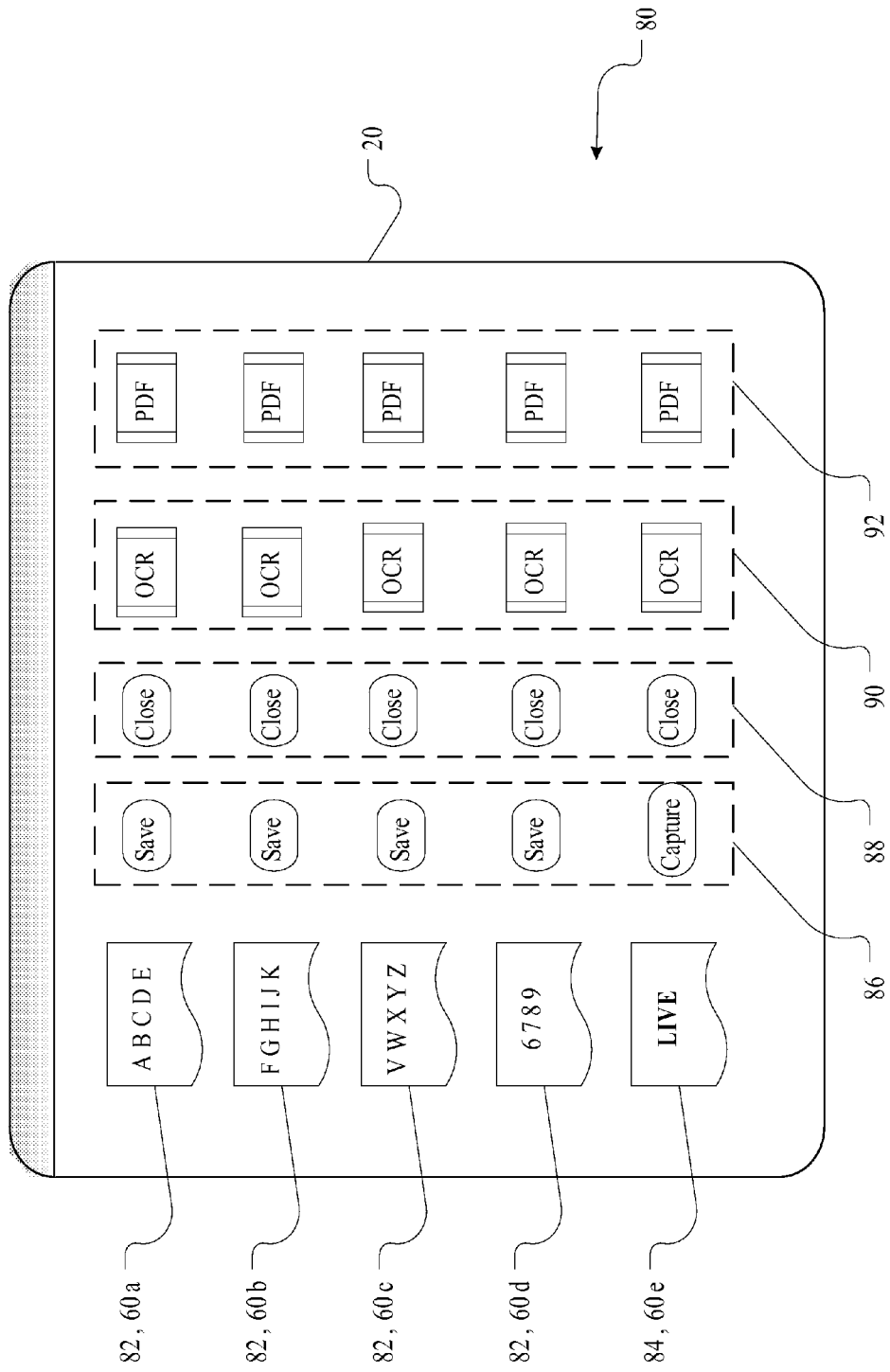
FIG. 5 illustrates an illustrative interface for displaying a menu of captured areas of focus.

Once a plurality of areas of focus have been captured and stored, it may be beneficial to establish a catalog or a menu of areas of focus for viewing (FIG. 5). This menu 80 can be kept in text form or thumbnail images 82 of the respective views. The user can then easily move between the different areas of focus without having to recapture or reload the images. It is also possible to establish an area of focus containing a live view of a preferred area 84, or any subset thereof. From this interface it is possible to save the corresponding image to mass memory (86) or delete/close the image (88). Additional functionality is also added by coupling the stored images with optical character recognition (OCR) software 90 to allow text elements in the area of focus to be saved in files usable by word processors, or to be converted to a predetermined format 92 (i.e. .pdf) from the interface.

Figure 6:
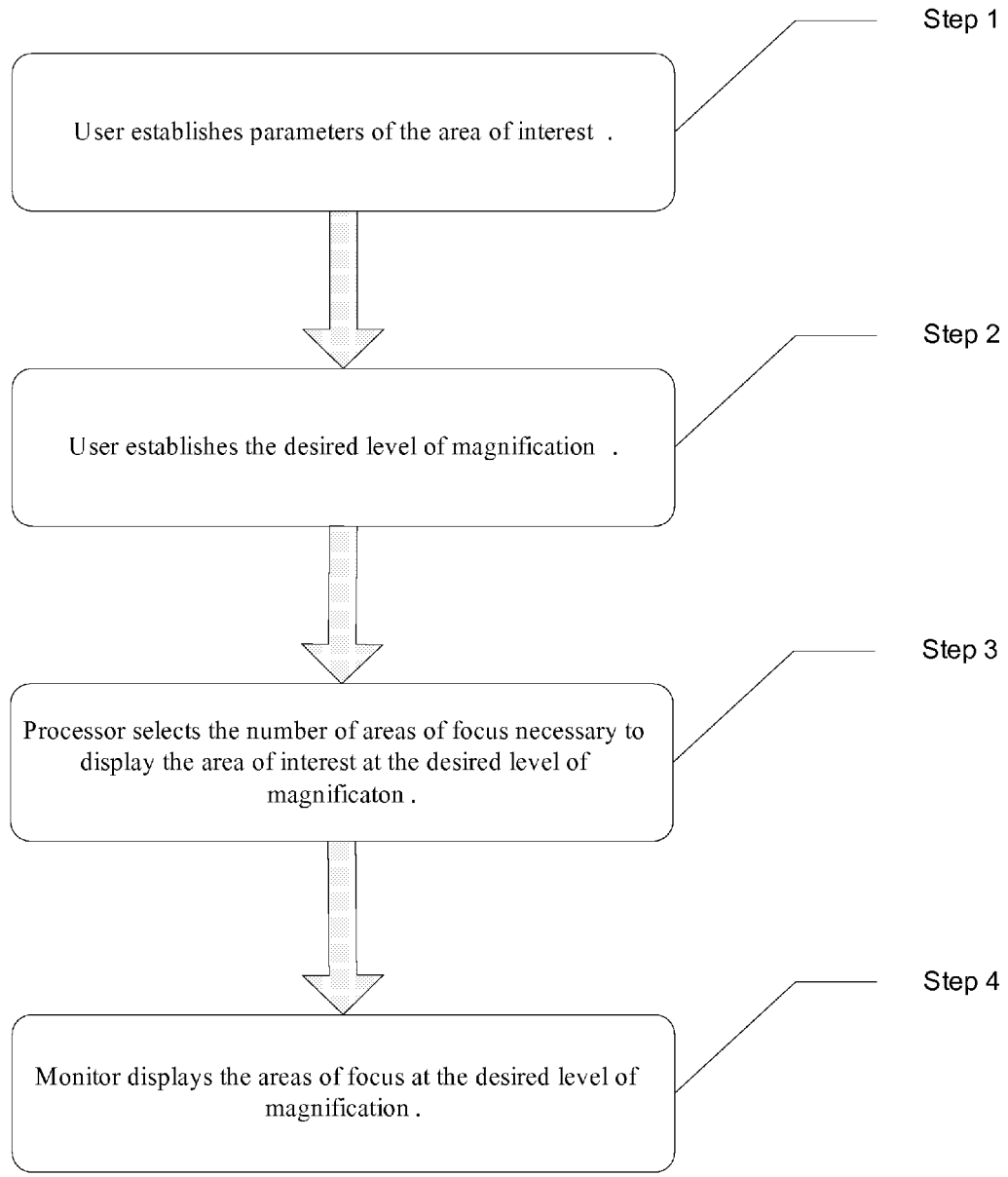
FIG. 6 is a block diagram illustrating one embodiment of the invention.

An alternate embodiment of the invention is shown in FIG. 6. In step 1, the user zooms in on the viewing; thereby establishing the parameters of the area of interest. The user then zooms in on the area of interest to a desired magnification level, one that is comfortable for them to see the content within the area of interest, in step 2. In step 3, the processor automatically calculates the number of areas of focus needed to capture the information within the area of interest at the desired magnification level. For example, if the user does not zoom in after establishing the parameters of the area of interest, the number of areas of focus needed to capture the information is one (1). If, however, the user zooms into a magnification level of 8×, then additional areas of focus will be required. The number of areas of focus corresponding to an increase in magnification is the square of the magnification value. Therefore, if the area of interest is viewed at a magnification level of 8× then the number of areas of focus required is sixty four (64).

Once the necessary number of required areas of focus is calculated, each area of focus is displayed as a live image on the monitor (Step 4). In yet another embodiment, each area of focus is captured from an image of the entire area of focus or by a motorized device attached to the image capture device (discussed supra).

The user can navigate through the areas of focus using simple controls such as up, down, left and right. If the user moves to an area of focus which touches the boundary of the area of interest, subsequent commands to cycle in the direction of the outer parameter are ignored, as this would take the user outside the area of interest. Instead, the processor determines the next logical area of interest for display.

The user may determine that some areas of focus contain no useful information while they are in the process of navigation. In this case, the user can exclude unwanted areas of focus from the navigation cycle. Once an area of focus is marked for exclusion, it is skipped in the navigation cycle. When the user comes to a place in the navigation cycle where an area of focus has been removed, the processor determines the next logical area of interest for display.

Figure 7:
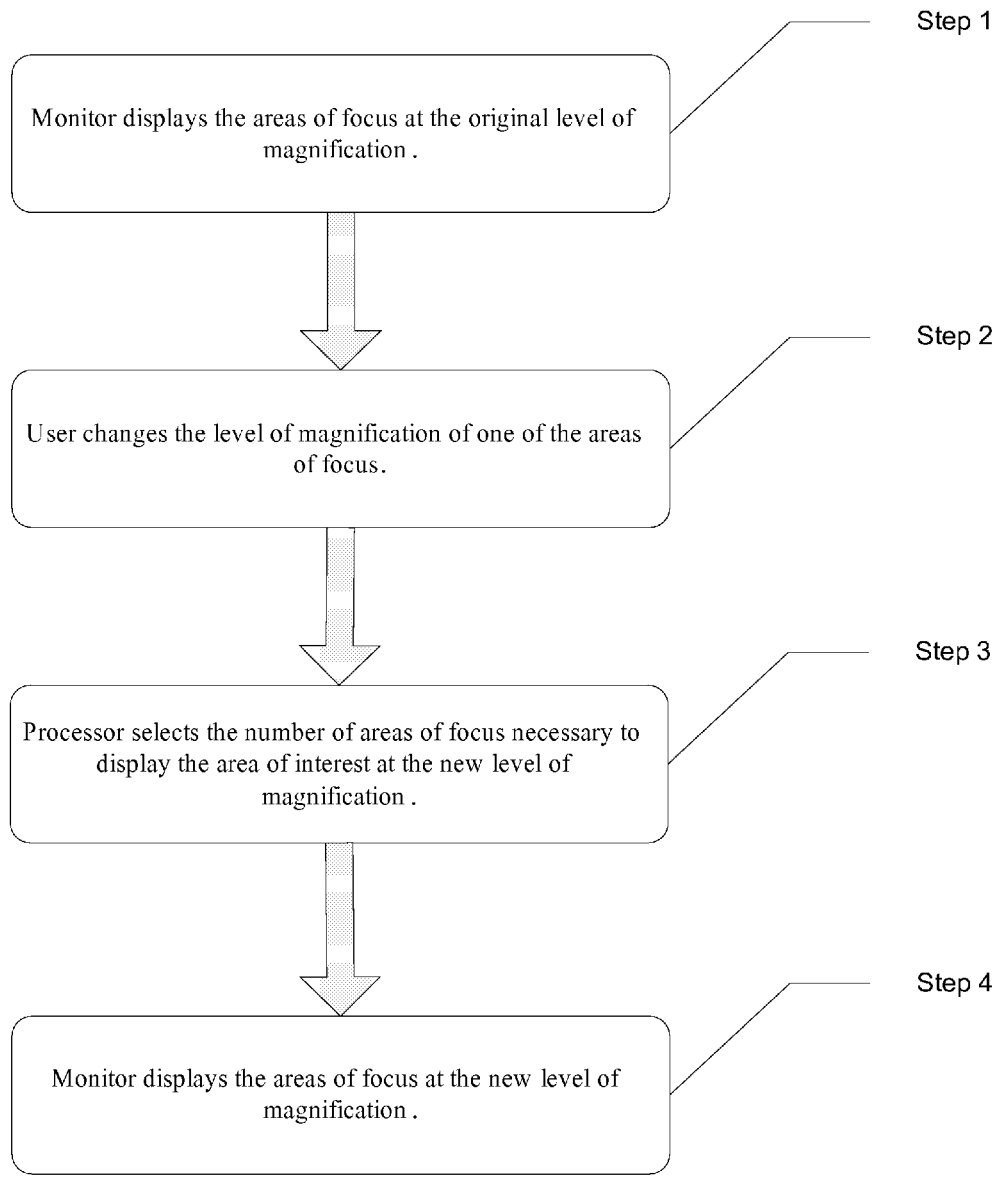
FIG. 7 is a block diagram illustrating an alternate embodiment of the invention.

In yet another embodiment, shown in FIG. 7, the areas of focus can be reestablished responsive to the user changing the magnification of any area of interest. For example, the user establishes an area of interest and selects a magnification level of 4×. The processor then determines that four (4) areas of magnification are required and displays them on the monitor. In step 1 of this embodiment, the areas of focus are shown at the original level of magnification. In step 2 the user changes the magnification level of one of the areas of focus to 8×. The processor, in step 3, reestablishes the number of areas of focus necessary to cover the area of interest (which is 64, the square of the magnification level 8). The new areas of focus are then displayed at the new magnification level (8×) in step 4. The user can also elect to exclude previously removed areas of focus from the new segmentation.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between. Now that the invention has been described,

The invention claimed is:

1. An image display method, comprising the steps of:
providing an image capture device designed for use by a person with low vision;
providing a monitor in communication with the image capture device;
providing an image memory in communication with the image capture device and the monitor;
defining an area of interest and displaying the area of interest on the monitor;
selecting a desired level of magnification for the area of interest, the desired magnification being sufficient to permit viewing by the person with low vision;
automatically establishing a number of areas of focus within the area of interest, the number of areas of focus depending upon the selected level of magnification, the areas of focus being generated without the user having to recapture information;
panning the image capture device to each of the established areas of focus;
capturing images from each of the established areas of focus, with each area of focus comprising at least a portion of the area of interest;
storing the captured images in the image memory;
establishing a location parameter associated with each captured image;
displaying the captured images on the monitor;
and cycling through the plurality of captured images in accordance with the position parameter associated with each captured image.

2. The method of claim 1, further comprising the step of varying the magnification of at least one of the plurality of captured images displayed on the monitor.

3. The method of claim 2, wherein the step of varying the magnification of at least one of the plurality of captured images displayed on the monitor results in a corresponding change to the remaining images displayed on the monitor.

4. The method of claim 2 wherein the magnification of the captured images on the monitor further comprises the step of supplying missing pixels for the captured images being displayed using interpolation techniques.

5. The method of claim 1 wherein the position parameter established for each captured image correlates to the image position relative to the area of interest.

6. The method of claim 1 wherein the position parameter is assigned by a user.

7. The method of claim 1, further comprising the step of displaying a live image of an area selected from the group consisting of the area of interest and an area of focus.

8. The method of claim 1 wherein the plurality of captured images are stored independently.

9. The method of claim 1 wherein at least two of the plurality of captured images are stored in an array.

10. The method of claim 1 further comprising the steps of: capturing an image of the entire area of interest; and storing the image of the entire area of interest in the image memory.

11. The method of claim 10 wherein the captured images of the plurality of areas of focus are captured from the image of the entire area of interest.

12. The method of claim 1, further comprising the step of copying an image in the image memory to permanent memory.

13. The method of claim 1, further comprising the step of providing a control to selectively remove at least one of the plurality of captured images from image memory without affecting the remaining images.

14. The method of claim 13, wherein cycling through the plurality of captured images responsive to the position parameter associated with each image causes the monitor to display the next logical image when an image is removed from image memory.

15. An image display device comprising:
a processor module;
an image capture device communicatively coupled to the processor module;
a monitor communicatively coupled to the processor module; and
an image memory communicatively couple to the processor module;
wherein the image capture device is adapted to define an area of interest at a specified magnification;
the processor module determining a number areas of focus within the area of interest, the number depending upon the specified magnification, the areas of focus being automatically generated without the user having to recapture information;
wherein the image capture device is further adapted to capture an image associated with each area of focus, each image being magnified to the specified magnification;
wherein the processor module is adapted to establish a location parameter to each area of focus;
wherein said image memory is adapted to store the plurality of images captured by the image capture device; and
wherein the monitor is adapted to display each area of focus as a full image.

16. The method of claim 15, further comprising the step of varying the magnification of at least one of the plurality of images displayed on the monitor.

17. The method of claim 16, wherein cycling through the plurality of images responsive to the position parameter associated with each image causes the monitor to display the next logical image when the location parameter associated with an image removed from image memory is selected in the cycle.

18. The device of claim 16 wherein the control device is adapted to supply missing pixels of the image being displayed using interpolation techniques.

19. The device of claim 15 wherein the position parameter established for each image correlates to the image position relative to the first area of interest.

20. The device of claim 15 wherein the position parameter is assigned by a user.

21. The device of claim 15, wherein the monitor is adapted to display a live image of an area selected from the group consisting of the area of interest and an area of focus.

22. The device of claim 15 wherein the image memory is adapted to store the plurality of images independently.

23. The device of claim 15 wherein the image memory is adapted to store the plurality of images in an array.

24. The device of claim 15 wherein the image capture device is further adapted to capture an image of the entire area of focus.

25. The device of claim 24 wherein the plurality of images are captured from the image of the entire area of focus.

26. The method of claim 15, further comprising the step of providing a control to selectively remove at least one of the plurality of images from image memory without affecting the remaining images.

27. The method of claim 26, wherein cycling through the plurality of images responsive to the position parameter associated with each image causes the monitor to display the next logical image when the location parameter associated with an image removed from image memory is selected in the cycle.

28. An image display method, comprising the steps of:
providing an image capture device;
providing a monitor in communication with the image capture device;
defining an area of interest;
establishing a desired level of magnification for the area of interest;
establishing a plurality of areas of focus responsive to the desired level of magnification for the area of interest, each area of focus comprising at least a portion of the area of interest, the areas of focus being automatically generated without the user having to recapture information;
displaying at least one of the areas of focus on the monitor at the desired level of magnification.

29. The method of claim 28, wherein a live image of the area of focus is displayed on the monitor.

30. The method of claim 28, further comprising the step of providing a navigation control adapted to cycle through the plurality of areas of focus.

31. The method of claim 30, further comprising the step of removing an area of focus from the cycle.

32. The method of claim 31, further comprising the step of replacing the area of focus removed from the cycle with the next logical area of focus.

33. The method of claim 28, further comprising the steps of:
providing a control for varying the level of magnification of at least one of the areas of focus displayed on the monitor; and
re-establishing a plurality of areas of focus responsive to the level of magnification of the at least one area of focus.

34. The method of claim 28, further comprising the steps of:
providing an image memory in communication with the image capture device and display; and
storing at least one area of focus in the image memory as a still image.

35. The method of claim 34 wherein the still image of the area of focus is stored independently.

36. The method of claim 34 wherein still images of the areas of focus are stored in an array.

37. The method of claim 34, further comprising the step of providing a control adapted to toggle between a live image of an area of interest and a still image of the area of interest saved in image memory.

38. The method of claim 28, further comprising the steps of:
providing a permanent memory; and
copying an image in the image memory to permanent memory.

* * * * *